Lowith & Howe,
Grain Drill.
No. 86,561. Patented Feb. 2, 1869.
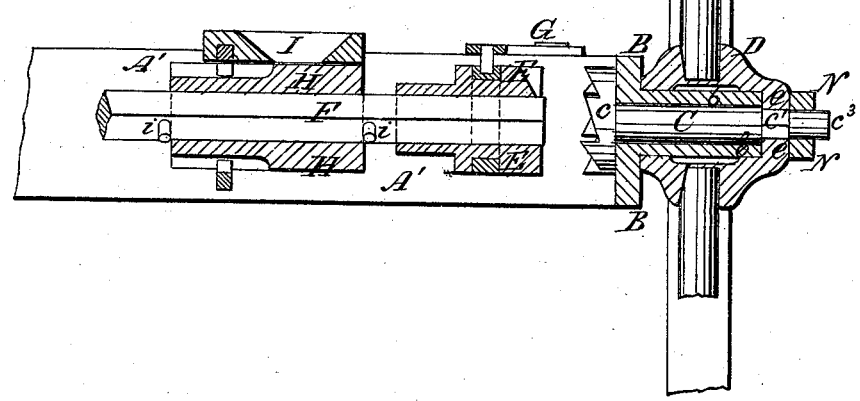
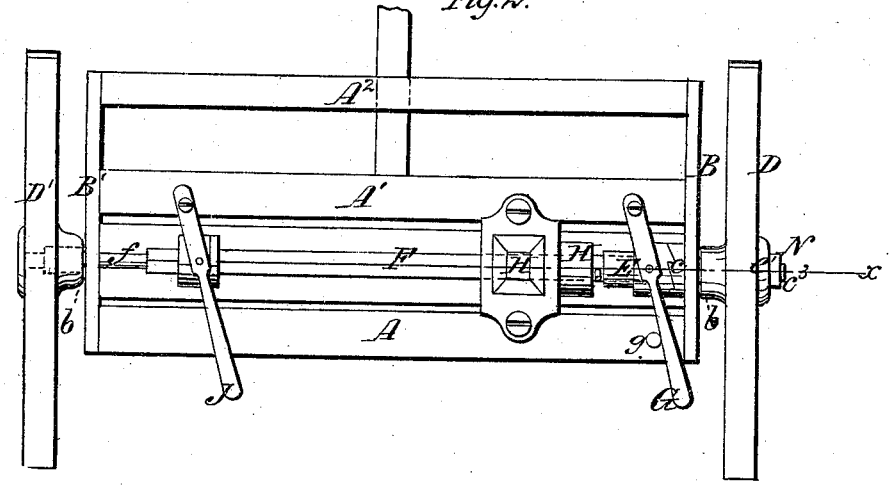
Witnesses.
Nathan K. Smith
James H. Gridley
Inventors.
W. F. Lowith & D. J. Howe
per Munn & Co.
Attys.

M. F. LOWTH AND T. J. HOWE, OF OWATONNA, MINNESOTA.

Letters Patent No. 86,561, dated February 2, 1869.

---

IMPROVEMENT IN SEED-SOWER.

---

The Schedule referred to in these Letters Patent and making part of the same.

---

*To all whom it may concern:*

Be it known that we, M. F. LOWTH and T. J. HOWE, of Owatonna, in the county of Steele, and State of Minnesota, have invented a new and improved Seed-Sower; and we do hereby declare the following to be a full, clear, and exact description of the same, sufficient to enable others skilled in the art to which the invention appertains, to fully understand and use it, reference being had to the accompanying drawings, forming part of this specification, and in which—

Figure 1 is a section through line $x\ x$ of fig. 2.

Figure 2 is a top view.

This invention relates to that class of seed-sowers in which the seed is distributed by means of a series of grooved cylinders, arranged upon a rotating shaft, under the seed-box, each working in a concave cap, through which the seed is fed.

This improvement consists in a novel construction and arrangement of the shaft, clutch, draught-wheels, and axles, in connection with said cylinders and caps, and the lever for regulating the feed, whereby the construction of the machine is greatly simplified, and its cost reduced, while it is rendered stronger and more durable than heretofore.

In the drawings—

A $A^1$ $A^2$ represent the wooden cross-beams of the frame, and

B B', the longitudinal side pieces, which may be made of metal.

Upon the outer side of each of the pieces B B' is cast a hollow stud-bearing, $b$, for the draught-wheels D D'.

The hub of each wheel is cast so as to bear upon the stud $b$, the whole length of the latter, and to extend beyond its outer end, as seen at $e\ e$, being provided there with an inward-projecting flange, which comes against the end of the bearing.

A spindle, C, is arranged within the hollow bearing, as seen in fig. 1, and upon the inner end of it is cast, or otherwise fastened, a clutch-head, $c$, which fits against the inner side of the frame-piece B.

At its opposite end, at $c^1$, the spindle is reduced in size, and made square, fitting accurately into a square opening in the hub, enclosed and formed by the flange $e$.

Outside of the flange, the spindle terminates in a screw, $c^2$, provided with a nut, N.

The wheel D being placed upon its bearing $b$, and the spindle C being inserted into the bearings, so that its square part, $c^1$, shall extend through the square opening in the hub, then, by screwing the nut N firmly against the hub, the latter and the clutch $c$ are so connected together that the wheel cannot rotate without communicating its motion to the clutch.

The opposite draught-wheel bears upon the other hollow stud, and is held in place by a nut having a screw-stem, which screws into the open end of the stud.

Directly between the two draught-wheels, and in a line with their axes, is a square shaft, F, one end of which is reduced in size, and rounded off, as seen at $f$, so as to project into and bear in the hollow stud that supports wheel D', the other end coming square up to the centre of the clutch-head $c$, which may be hollowed out a little at that point, to prevent friction against the shaft.

At the latter end of the shaft is arranged a common sliding friction-clutch, E, operated by a lever, G, and working in connection with the head $c$, to move or stop the shaft F.

H is the ordinary seed-distributing cylinder, held in place on the shaft F, by means of pins $i\ i$, wedges, or other suitable device.

I is the cap, through which the seed is fed from the seed-box, (not shown in the drawing,) and J is the lever, by which the whole shaft is moved longitudinally, for the purpose of adjusting the "feed" of the seeder.

$g$ is a small pin, which holds the lever G in place, preventing the clutch from engaging or disengaging improperly.

It is evident that the lever G being held in place, the shaft F can be moved lengthwise in either direction, by means of lever J, without interrupting the action of the clutch and the operation of the machine.

It is also evident that the lever J or shaft F being held in place, the clutch H can, by means of lever G, be caused to engage with or disengage from its counterpart $c$, without disturbing the position of the parts that constitute the feeding-apparatus.

The shaft F, besides the bearing at one end, as above described, may be provided with other bearings, attached to the cross-beams A $A^1$.

The whole device operates directly from the right draught-wheel without gearing of any kind, dispensing with the necessity of an axle, and the multiplication of parts heretofore thought absolutely necessary, and rendering the machine much more simple, both in construction and operation.

Having thus described our invention,

What we claim as new, and desire to secure by Letters Patent, is—

1. In connection with two draught-wheels D D', bearing on hollow studs, which project from the frame of the carriage, so that said wheels run independently of an axle-tree, and of each other, the square or polyhedral feed-cylinder shaft F, situated in line with the axes of said wheels, and capable of sliding longitudinally, and of being connected at pleasure to one of the draught-wheels, so as to receive motion therefrom, by means of a friction-clutch, E $c$, substantially as described, and for the purpose set forth.

2. The combination of the part C $c$ $c^1$ $c^2$ with the hollow stud $b$, the screw-nut N, and the hub of the wheel D, provided with the flange $e$, the whole being constructed to operate substantially as and for the purposes specified.

M. F. LOWTH.
T. J. HOWE.

Witnesses:
C. W. BURDIC,
E. B. DURGIN.